Jan. 24, 1956  R. D. HOLT  2,731,769

TOY AIRCRAFT AND LAUNCHING DEVICE THEREFOR

Filed Aug. 21, 1950

INVENTOR.
RALPH D. HOLT
BY
Charles S. Penfold
ATTORNEY

United States Patent Office 2,731,769
Patented Jan. 24, 1956

2,731,769

TOY AIRCRAFT AND LAUNCHING DEVICE THEREFOR

Ralph D. Holt, Beloit, Wis.

Application August 21, 1950, Serial No. 180,639

8 Claims. (Cl. 46—243)

This invention relates generally to amusement devices and more particularly has to do with means for launching toy aircraft such as an aeroplane.

One of the principal objects of the invention is to provide a launching device embodying improved principles of design and construction including manually operable locking means whereby an aircraft can be held on the device and then released after its propeller has attained a speed sufficient to initiate flight.

An important object of the invention is to provide a launching device having a casing which serves as a housing for a power unit in the form of an electric motor for driving a propeller and as a launching platform for an aircraft.

Another object of the invention is to provide the platform with an opening through which the power unit and propeller shaft can be operatively connected.

A significant object of the invention is to provide a setup whereby the locking means above referred to will automatically lock the aeroplane on the platform when properly located thereon. With such an arrangement it is not necessary to manually adjust the locking means before the propeller shaft can be coupled with the power unit.

Another object of the invention is to provide a launching device having an electric motor for driving the propeller shaft of an aircraft and means such as a rheostat for varying the speed of the motor.

An additional object of the invention is to locate the locking means and the means for varying the speed of the motor in predetermined positions for convenient manipulation.

A specific object of the invention is to provide a toy aeroplane and launching device therefor embodying unique principles of design and construction, and in which the launching device includes a launching platform having tracks for the wheels or supports of the aeroplane and a casing having an offset to provide a rest for the tail, port, or rear support of the aeroplane.

Another object of the invention is to provide an aeroplane with a propeller shaft extending longitudinally through its fuselage with its rear end exposed for detachable connection with a motor shaft extending outwardly from the casing.

Another object of the invention is to provide the aeroplane with a tail skid having abutment means thereon for engagement with a locking means on the launching device.

A further object of the invention is to provide the tail skid or other part of the aircraft with means for automatically actuating the locking means to place the latter in holding engagement with the abutment means.

A still further object of the invention is to provide a launching device which is safe for children to operate, one which is durable and efficient in operation, and means whereby the altitude and duration of flight of an aircraft can be controlled as desired.

Other objects and advantages of the invention will be realized after the description hereinafter set forth is considered in connection with the drawings constituting a part of the subject specification.

Figure 1:
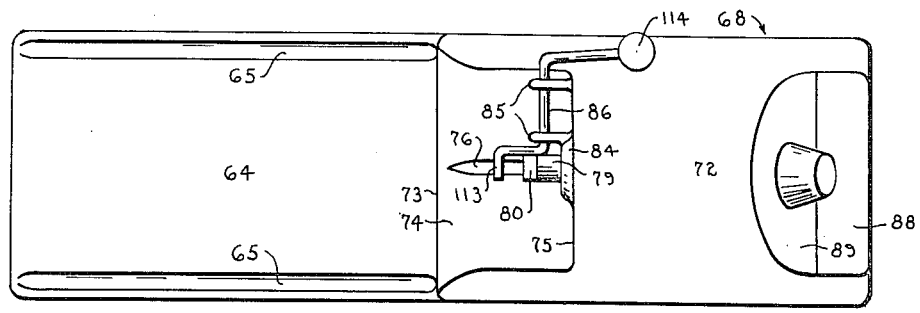
Figure 1 is a top view of the launching device for an aeroplane.

The launching device may be made of any material suitable for the purpose and designed and constructed as desired, but as herein illustrated is preferably made of a moulded plastic. More particularly, it is made generally rectangular in shape and, among other things, comprises a launching platform 64 provided with a pair of parallel grooves or tracks 65 which receive the landing wheels 66 of an aeroplane 67 and assist in guiding the plane in a straight course or direction as it is projected forwardly off the platform. The launching device also includes a casing 68 which houses an electric motor 69, dry cell batteries for operating the motor, and a resistance coil 70 of a rheostat.

The casing is open at its bottom to permit ready access to the motor, batteries, and various electrical conductors and connections operatively connecting the motor, batteries and rheostat, all of which will be described in detail subsequently. The casing comprises a pair of corresponding inclined longitudinal side walls 71 which merge with an arcuate top wall 72. The fore extremity of the casing includes a lower front vertical wall 73, a rearwardly extending horizontal wall 74, and an upper vertical wall 75. The horizontal wall is provided with a central groove 76 which is adapted to receive a skid 77 carried by the tail of the fuselage. This wall constitutes a rest for supporting the tail of the aeroplane. The groove 76 serves to locate the tail of the aeroplane and assists in guiding the aeroplane in a straight course in the same manner as the grooves 65 in the platform 64.

The upper vertical wall 75 is provided with a clearance opening 78 through which the drive shaft 79 of the motor extends. The forward end of the shaft is provided with a key portion 80 which is adapted to be received in a recess 81 provided therefor in a fitting 82 carried by the rear end of a propeller shaft 83 extending longitudinally through to the fuselage. The horizontal wall 74 and wall 75 are reinforced by a forwardly extending boss 84 formed about the opening and also by a pair of spaced lugs 85 which pivotally support a manually operable crank 86 constituting a component of a locking means which will be described more in detail subsequently. The rear extremity of the casing includes a vertical end wall 87, a horizontal wall 88 and an inclined wall 89. The inclined wall supports the rheostat and is so disposed that the knob of the rheostat will be more or less inset to promote safety.

Figures 3, 4:
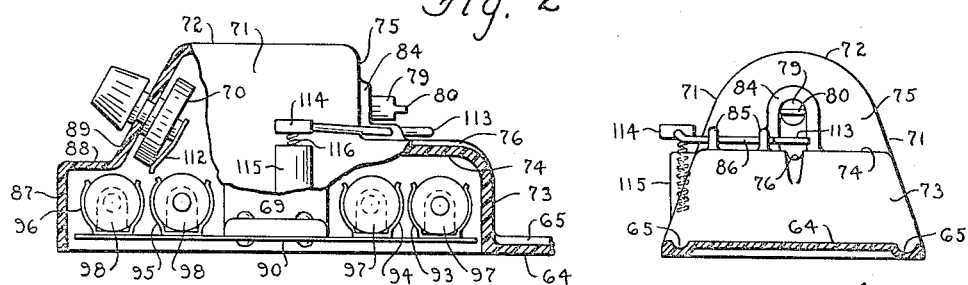
Figure 3 is a partial section of the launching device showing a part of the locking means.
Figure 4 is a transverse section of the launching device showing certain details of construction.
Figures 5, 6:
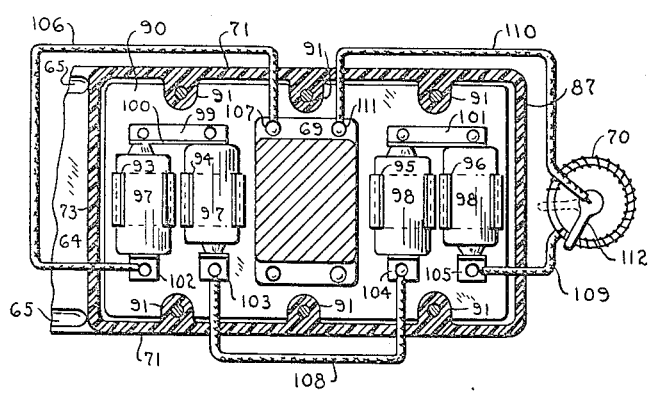
Figure 5 is a transverse section of the launching device showing other details.
Figure 6 is a plan view showing the electrical hook-up.

The motor and dry cells for operating it may be mounted in the casing in any manner desired, but as herein illustrated they are supported on a mounting plate 90 of insulating material. The casing is provided with a plurality of inwardly extending integral lugs 91 as shown in Figure 4 and screws 92 project through the plate into the lugs for detachably fastening the plate in the casing. The motor is anchored in an upstanding position to the central portion of the plate. A first pair of spring clips 93 and 94 are attached to one extremity of the plate and a corresponding second pair 95 and 96 are attached to the other extremity of the plate. Pairs of batteries 97 and 98 are respectively detachably carried by the pairs of clips. A contact means 99 is secured to the plate and provided with a yieldable portion 100 which forcibly engages terminals of the pair of batteries 97. A contact means 101 corresponding to contact means 99 is also carried by the plate with its yieldable portion engaging terminals of batteries 98. The plate also carries a contact means 102 having a yieldable portion for engaging a terminal of one of the batteries 97. The mounting plate is further provided with contact means 103, 104, and 105, which correspond with contact means 102, and engage terminals on the other batteries. These contact means are thus held in intimate engagement with the batteries to establish good electrical connections.

A conductor 106 has one end connected to a terminal 107 on the motor and its other end to the contact means 102. A conductor 108 connects contact means 103 with contact means 104, and a conductor 109 connects contact means 105 with the resistance coil 70 of the rheostat. A conductor 110 has one end connected to the other terminal 111 on the motor and its other end to a yieldable contact arm 112, which is operated by the knob. This rheostat functions in the same manner as the rheostat 14 above described, to carry the flow of current from all of the batteries to the motor.

The crank 86 of the locking means alluded to above is provided with an offset holding portion 113 and a handle 114 for actuating the holding portion. One side wall of the casing is preferably provided with an upstanding tube 115 within which is disposed a helical spring 116 under tension. The spring is based in the tube and its upper end engages and urges the handle upwardly to normally maintain the holding portion 113 downwardly against the horizontal wall 74.

Figure 2:
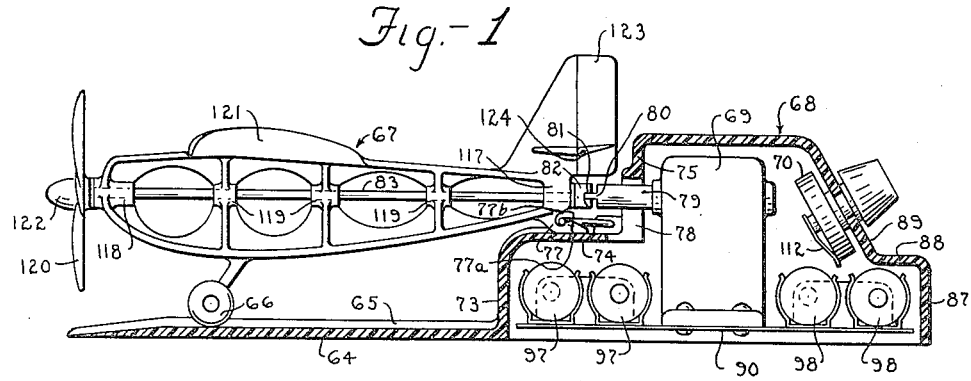
Figure 2 is a longitudinal section of the launching device with an aeroplane seated thereon.

The aeroplane 67 may be constructed of any suitable material but is preferably made of moulded plastic and is relatively light in weight. The tail of its fuselage is provided with the skid 77 above referred to. This skid includes a flat portion at its under side which bears against the platform, an upper inclined cam portion 77a, and abutment means 77b formed by a notch as illustrated in Figure 2. The locking portion 113 of the locking means is adapted for disposition in the notch as will be described subsequently. The fuselage is generally of open framework construction to reduce its weight. Its tail is provided with an end bearing 117 and its nose with an end bearing 118. The fuselage is also provided with three similar bearings 119 interposed in spaced apart relationship with respect to one another and the end bearings. These bearings are suitably braced to provide a support for the propeller shaft which reduces friction to a minimum. A propeller 120 carried by the shaft is related to an aerofoil or wing 121 on the fuselage so that when rotated at a predetermined speed it will cause the aeroplane to take off in flight. The propeller may be provided with a forwardly extending portion 122 so as to produce some flywheel effect to prolong the rotation of the propeller, particularly after it has left the launching platform. The fuselage is further provided with a stabilizer fin carrying a rudder 123 and a stabilizer fin carrying an elevator 124 which is slightly inclined to assist in directing the aeroplane upwardly.

To operate the toy aeroplane is a simple procedure. The aeroplane is first arranged on the platform with the tail skid disposed in the groove 76 formed in the rest wall 74 and is then pushed rearwardly so that the inclined cam surface 77a will gradually elevate the locking portion 113 until such portion snaps into the notch relative to the abutment means to automatically lock the aeroplane in place with the recess 81 provided in the fitting 82 on the propeller shaft receiving the key 80 on the drive shaft 79. Thereafter the rheostat may be operated to control the flow of current from all of the batteries to the motor, and when the motor shaft, propeller shaft and propeller have attained a predetermined speed, the handle 114 of the locking means can be depressed to release the locking portion 113 from the abutment means, whereupon the aeroplane will take off in flight from the launching platform and rest. The motor can then be repeatedly stopped and started by manipulating the rheostat as desired.

It is, of course, to be understood that the aircraft can be released at any time desired while the motor is in operation. It will thus be evident that insofar as the aeroplane is concerned the rheostat can be manipulated to project the aeroplane across a floor or table top in lieu of having it fly and control its altitude and duration of flight.

In view of the foregoing description it will be manifest that I have provided a toy that embodies improved principles of design and construction and that although such description has been given in detail, it is not the intention to thereby restrict the scope of the invention beyond that defined by the appended claims, since the inventive principles thereof are capable of assuming other physical embodiments than that hereinbefore described.

I claim:

1. A launching device for a toy aeroplane having a propeller, wheels and a tail skid, said device comprising an elongated body having a launching platform and a casing, said platform having means thereon for guiding the wheels on said aeroplane, said casing being formed to provide a rest for the skid when the wheels of the aeroplane are on the platform, a mounting plate detachably supported in the casing, an electric motor and a source of power therefor carried by the mounting plate, a switch for controlling the flow of current from the source to the motor, an opening provided in the casing adjacent to the rest, said motor having a rotary shaft accessible by means of the opening, and means on the shaft for establishing a detachable driving connection with the rear end of a propeller shaft on said aeroplane.

2. A launching device for a toy aeroplane having a propeller and shaft therefor, wheels and a tail skid, said device comprising an elongated body having a launching platform and a casing, said platform having means thereon for guiding the wheels on said aeroplane, said casing being formed to provide a rest for the skid when the aeroplane is placed in launching position with the wheels on the platform, a mounting plate detachably supported in the casing, an electric motor and a source of power therefor carried by the mounting plate, a switch for controlling the flow of current from the source to the motor, an opening provided in the casing adjacent to the rest, said motor having a rotary shaft accessible by means of the opening, means on the shaft for establishing a detachable driving connection with the propeller shaft on said aeroplane, and manual operable latch means carried by the body cooperable with a part on the aeroplane for holding the latter on the platform and rest until released.

3. In combination: a launching device and an aeroplane having a propeller shaft, two wheels and a skid, said launching device comprising a housing provided with an upper substantially horizontal wall providing a rest for the skid and an adjacent upstanding wall provided with an opening, a power unit supported within the confines of the housing and accessible through the bottom of the housing, said power unit having a rotary shaft extending through said opening, an extension projecting outwardly from the lower part of the housing and on a plane lower and parallel to the rest for supporting the wheels of the aeroplane, the skid of said aeroplane being formed to provide a cam surface and a recess spaced from the cam surface, a spring pressed latch mounted on the rest in a position whereby when the aeroplane is being placed in launching position on the launching device with its propeller aligned with the power unit shaft the cam on the skid will retract the latch and cause the latch to move into the recess to hold the skid on the rest and the propeller shaft coupled to the power unit shaft, and manual means operatively connected to the latch for releasing it from said recess.

4. A launching device for a toy aeroplane having a propeller and a shaft therefor, front supports and a part on the tail, said device comprising an elongated body having a launching platform and a casing, said casing being formed to provide a rest for the tail part when the supports are placed on the platform, a motor mounted in the casing for connection with a source of power, a control for controlling the power to the motor, an opening provided in the casing adjacent to the rest, said motor having a drive shaft accessible by means of the opening, and means on the shaft for establishing a detachable driving connection with the propeller shaft on the aeroplane.

5. A launching device for a toy aeroplane having a shaft and propeller thereon, a pair of front supports and a tail support, said device comprising a body having a casing, said casing being formed to provide a rest for the tail support when the aeroplane is placed in a launching position with the front supports in front of the casing, a motor disposed in the casing for connection with a source of power, a control for controlling the power to the motor, an opening provided in the casing adjacent to the rest, said motor having a shaft accessible by means of the opening, means on the shaft for establishing a detachable driving connection with the propeller shaft, and manual operable latch means carried by the body cooperable with a part of the aeroplane for holding the latter in position with the tail support on the rest until released.

6. A launching device for a toy aeroplane having a shaft and propeller thereon, a pair of front supports and a tail support, said device comprising an elongated body having a launching platform and a casing, said casing being formed to provide a rest for the tail support for the aeroplane when the front supports are placed on the platform, an electric motor mounted in the casing for connection with a switch for controlling the flow of current from a source to the motor, an opening provided in the casing adjacent to the rest, said motor having a shaft accessible by means of the opening, means on the shaft for establishing a detachable driving connection with the propeller shaft, and manual operable latch means carried by the body for cooperation with a part on the aeroplane for holding the latter on the platform and rest until released.

7. In combination: a launching device and an aeroplane having a propeller shaft, front supports and a tail part provided with a rear support, said launching device comprising a housing provided with an upper substantially horizontal wall providing a rest for the rear support and an adjacent upstanding wall provided with an opening, a power unit in the housing, said power unit having a drive shaft accessible through said opening, an extension projecting outwardly from the housing in a plane lower than the rest for supporting the front supports of the aeroplane, the tail part of said aeroplane being formed to provide a cam surface and a recess spaced from the cam surface, a yieldable latch mounted adjacent the rest in a position whereby when the aeroplane is being placed in position on the launching device with its shaft aligned with the drive shaft the cam on the tail part will retract the latch and allow the latch to move into the recess to hold the rear support on the rest and the propeller shaft coupled with the drive shaft, and manual means operatively connected to the latch for releasing it from said recess.

8. In combination: a launching device and an aeroplane having a propeller shaft, front supports and a tail part provided with a rear support, said launching device comprising a housing provided with an upper substantially horizontal wall providing a rest for the rear support and an adjacent upstanding wall provided with an opening, a power unit disposed in the housing, said power unit having a drive shaft accessible through said opening, an extension projecting outwardly from the housing in a plane lower than the rest for supporting the front supports of the aeroplane, the tail part of the aeroplane being provided with an abutment, a yieldable latch engaging the abutment and serving to hold the aeroplane in a launching position on the launching device and the propeller shaft coupled with the drive shaft, and manual means operatively connected to the latch for releasing it from said abutment.

References Cited in the file of this patent

UNITED STATES PATENTS

| | | |
|---|---|---|
| 408,749 | Robinson | Aug. 13, 1889 |
| 984,683 | Luce | Feb. 21, 1911 |
| 1,295,537 | Lorentzen | Feb. 25, 1919 |
| 1,597,532 | Mentzer | Aug. 24, 1926 |
| 1,935,534 | Wilmot | Nov. 14, 1933 |
| 2,012,600 | Fischer | Aug. 27, 1935 |
| 2,192,595 | Chapons | Mar. 5, 1940 |
| 2,426,437 | Cole | Aug. 26, 1947 |
| 2,537,393 | Bisch et al. | Jan. 9, 1951 |

FOREIGN PATENTS

| | | |
|---|---|---|
| 407,340 | France | Feb. 24, 1910 |
| 589,369 | Germany | Dec. 9, 1933 |
| 650,744 | Germany | Sept. 30, 1937 |